Patented Jan. 21, 1941

2,229,297

UNITED STATES PATENT OFFICE 2,229,297

CALCIUM ORTHOSILICATE REFRACTORY AND PROCESS OF MAKING THE SAME

Harley C. Lee, Columbus, Ohio, assignor, by mesne assignments, to Basic Dolomite, Inc., Cleveland, Ohio, a corporation of Ohio No Drawing. Application September 7, 1935, Serial No. 39,659

8 Claims. (Cl. 106—9)

In the production of refractories heretofore, lime-bearing magnesia products have been confined to magnesia refractories containing small amounts of lime and to dolomite refractories to which small amounts of fluxes have been added. Compositions which would involve formation of calcium orthosilicate have been avoided. With large amounts of lime, if the lime was left uncombined, it was readily susceptible to action by water or atmospheric moisture, and disastrous slaking soon occurred. If sufficient iron oxide or alumina were added to combine with the lime, the resultant compounds were so fusible that they were no longer refractory. If silica was added to take up the free lime, a correspondingly large amount of calcium orthosilicate or of tricalcium silicate was formed which had a propensity to dissociate into calcium orthosilicate and free lime, with corresponding detriment. When amounts of calcium orthosilicate, for instance over 10 per cent, were present, a particular difficulty ensued. Calcium orthosilicate has a peculiarity of existing in two forms, dependent upon temperature. At high tempreatures, the high temperature form or modification exists, and at low temperatures this goes over into the form of the low temperature modification, or inverts. The inversion to the low temperature modification is accompanied by a very material increase in volume, around 10 per cent, which causes disintegration of the body in which it occurs. Compositions in such ranges have in fact not stood up long enough to be tested and little has been known as to their specific properties, it being held that calcium orthosilicate should be avoided in all cases. I have now found however, how to make novel refractories involving calcium orthosilicate, and these are characterized by being only mildly basic and are able to resist certain types of slag better than the more basic dolomite or magnesite refractories. Furthermore, these refractories have a remarkable ability to carry loads at high temperatures, quite in contrast with ordinary magnesia refractories and this characteristic alone makes such refractories outstanding. Again, these have a very high melting point. It thus becomes possible to open up a new branch of the refractory field. It has been known in published researches of the Bureau of Standards (Technologic Paper No. 78, published 1917) on the investigation of Portland cement, that calcium orthosilicate could be prepared with considerable difficulty, in pure state, and it was not stated how permanent even this was against inversion. No stable calcium has been known anywhere in compositions having periclase and such materials as iron and aluminum compounds. I have now discovered that calcium orthosilicate in the presence of periclase and small amounts of metal oxides forming fluxes in the manufacture of refractories can be made, with stabilization which is permanent. I have further discovered that the bonding properties of calcium orthosilicate with magnesium oxide together with metal oxide fluxes can be controlled such as to realize the very high refractory qualities of the magnesia and orthosilicate, coupled with a superior mechanical load-carrying capability. Such refractory also is not only highly durable, but is feasibly applicable in usages where a basic refractory is fundamentally more desirable, but has heretofore been impossible of utilization, with consequent necessity of resort to the more mechanically applicable acid refractories.

To the accomplishment of the foregoing and related ends, the invention, then, comprises the features hereinafter described, and particularly pointed out in the claims, the following description setting forth in detail certain illustrative examples of the invention, these being indicative however, of but a few of the various ways in which the principle of the invention may be employed.

The relative amounts of magnesium oxide and calcium orthosilicate in my improved refractories may vary somewhat, depending upon the raw materials and the intended use of the refractory. Calcium orthosilicate contributes to the strength of the refractory, making it particularly capable of supporting loads at high temperatures. Illustratively, high calcium orthosilicate refractories are particularly valuable for use in walls or as a lining for kilns used in burning dolomite or Portland cement, and in appropriate composition ratio, for end walls of open hearth furnaces where a combination of strength and a more basic refractory is required. Calcium orthosilicate is formed where one part of silica is present for each 1.87 parts of lime, and the material is fired at high temperature. If the silica is decreased, for instance the ratio being one part of silica to over two parts of lime, some lime may be available to combine with iron oxide or the like, for the promotion of fluxing. Some lime may also combine with the silica to form tricalcium silicate along with the orthosilicate, and if the amount of tricalcium silicate be kept low, not to exceed for instance one-fifth of the total silicate, particular detriment may be obviated. To insure the formation of essentially calcium orthosilicate and to prevent the formation of harmful amounts of tricalcium silicate and of free lime, in general it is requisite to proportion the silica and lime such as to be not less than 1.8 parts of lime nor more than 2.2 parts of lime for each part of silica when the refractory contains 35–60 per cent of periclase. More particular ranges may be for instance about 1.85–2.05 to 1 with 35–40 per cent of periclase and 17–22 per cent of silica, about 1.85–2.1 to 1 with 40–45 per cent of periclase and 16–20 per cent of silica, about 1.85–2.1 to 1 with 45–50 per cent of periclase and 13.5–18.5 per cent of silica, about 1.8–2.15 to 1 with 50–55 per cent of periclase and 11.5–16.5 per cent of silica, and about 1.8–2.2 to 1 with 55–60 per cent of periclase and 10–15 per cent of silica for instance. The most refractory composition results when the lime to silica ratio is 1.87 to 1.

The metallic oxide flux components, as iron oxide, alumina, and chromium oxide, should be kept to a minimum, if maximum refractoriness of the product is desired. Iron oxide may be for instance 2–7 per cent, alumina 0.5–3 per cent, and chromium oxide 0–3 per cent, in general. With the higher lime ratios, such as 2.1 or 2.2 of lime to 1 of silica, part of the lime is available for combination with the metallic oxide constituents to form effective fluxes. The total metallic oxides may range from 3–8 per cent in such case. With magnesia up to about 45 per cent, as much as 9 per cent of metallic oxide fluxes may be tolerated, and with higher amounts of magnesia, slightly more metallic oxide fluxes, as up to about 10 per cent may be tolerated. The higher flux contents impair the refractory qualities, and it is correspondingly desirable to keep such content as low as possible, but the higher ranges make possible the use of less pure raw materials.

As raw materials for the compositions of lower magnesia content, dolomite may be employed, and in practice it is preferable to supply the silica in such form as a hydrous magnesium silicate, as for example talc or serpentine. Such hydrous silicates react readily with dolomite at high temperatures and also add magnesia along with the silica. Chlorite or vermiculite may be substituted for part of the talc or serpentine, care being taken to keep the metallic oxide content low. While part of the silica could be added in the form of sand, it requires extremely fine grinding and very high temperatures to secure stabilization and good combination of the lime with such form of silica. The form in which the silica is supplied is important. Very finely divided or preferably silica in a hydrated form is essential in attaining a calcium orthosilicate product of stable character. High magnesian material such as dunites or peridotites may be employed in place of all or part of the above-mentioned magnesium silicates in some instances, but it is more difficult to secure stabilization and combination with the lime than where a hydrated silicate such as serpentine is used. Metallic oxide flux components as for example mill scale or phosphatic iron ore may be added, or excessive amounts of such components present in the raw materials may be diminished as required. For products of the higher magnesia character, such raw materials as impure magnesites may be employed. In fact the present invention makes available impure magnesites heretofore useless to the refractory manufacturer. For instance, highly silicious magnesites, as occurring in the Western United States. Likewise, magnesites containing large amounts of lime, or magnesites containing both lime and silica as impurities can be used.

On account of the variation in condition of the ingredients as customarily commercially available, and consequent necessity for care if stable products are to result, it is thus necessary to select raw materials providing the silica in very finely divided or hydrated form, or where such care is not desirable, there are certain agents which can be added in small amounts in the process which have an apparently catalytic action or act in the direction of producing stable products. Such agents are $B_2O_3$, $P_2O_5$, and less desirably chromium oxide. These agents may be supplied as suitable compounds of boron or phosphorus for instance, as colemanite, razorite, rock phosphate, phosphatic iron ores, etc. The amount of the $B_2O_3$ or $P_2O_5$ in such usage may be 0.1 to 1 per cent. In practice, since both $B_2O_3$ and $P_2O_5$ may be subject to some loss from exposure to high temperature, the $B_2O_3$ or $P_2O_5$ or preferably mixtures thereof, are added in amounts of 0.4 to 1.0. The general composition of the refractory in its range then, may comprise for instance magnesia about 35–60 per cent, lime about 40–21 per cent, silica about 22–10 per cent, the ratio of lime to silica being 1.8–2.2 to 1 correspondingly, and the amount of the metallic oxides, iron alumina 3–10 per cent. And, as is generally preferable in the process of preparing the refractories, $P_2O_5$ or $B_2O_3$ 0.1 to 1.0 per cent, but these can be omitted where suitable raw materials are selected.

Illustrative composition ratios more in detail are as follows:

|   | Per cent |
|---|---|
| I. Magnesia | 35–40 |
| Lime | 40–35 |
| Silica | 22–17 |
| Metallic oxide fluxes | 3– 8 |
| Ratio of lime to silica: | |
| Minimum 1.85:1 | |
| Maximum 2.05:1 | |
| $B_2O_3$ or $P_2O_5$ | 0.25– 1 |
| II. Magnesia | 40–45 |
| Lime | 37–31 |
| Silica | 20–16 |
| Metallic oxide fluxes | 3– 8 |
| Ratio of lime to silica: | |
| Minimum 1.85:1 | |
| Maximum 2.1:1 | |
| $P_2O_3$ or $P_2O_5$ | 0.2– 1 |
| III. Magnesia | 45–50 |
| Lime | 33.5–27.5 |
| Silica | 18.5–13.5 |
| Metallic oxide fluxes | 3– 9 |
| Ratio of lime to silica: | |
| Minimum 1.85:1 | |
| Maximum 2.1:1 | |
| $B_2O_3$ or $P_2O_5$ | 0.2– 0.9 |
| IV. Magnesia | 50–55 |
| Lime | 30.5–24.5 |
| Silica | 16.5–11.5 |
| Metallic oxide fluxes | 3– 9 |
| Ratio of lime to silica: | |
| Minimum 1.8:1 | |
| Maximum 2.15:1 | |
| $B_2O_3$ or $P_2O_5$ | 0.15– 0.8 |
| V. Magnesia | 55–60 |
| Lime | 27–21 |
| Silica | 15–10 |
| Metallic oxide fluxes | 3– 9 |
| Ratio of lime to silica: | |
| Minimum 1.8:1 | |
| Maximum 2.2:1 | |
| $B_2O_3$ or $P_2O_5$ | 0.1– 0.7 |

The $B_2O_3$ or $P_2O_5$ can be omitted in the above where suitable raw materials are selected.

In the process of making my improved refractories, the minerals are finely ground and mixed, the grinding being preferably to minus 100 mesh size (Tyler standard screen), and the mixture may be fired to advantage in a rotary kiln, being fed either as a wet slurry or as a dry powder. In the kiln, the materials are fired to a temperature of 2600–3000° F., or suitable temperature to insure complete combination of the calcium oxide with the silica to form high temperature phase calcium orthosilicate and convert the magnesium oxide into the form of periclase. The product comes from the kiln in the form of rounded clinkers which can be used directly as such or can be crushed, and with the addition of a suitable amount of water, be molded and pressed into shapes and dried. Such shapes can be used in this state, or they can be re-fired to a hard, dense product. In some cases, the finely pulverized mixture of initial raw materials can be briquetted, and the briquettes fired in a stack or tunnel form of kiln and the product then crushed for further use. In the production of refractory brick or shapes, the fired refractory is crushed together with a small percentage of the very fine material and may be used and fired in place as desired. For most purposes it is more satisfactory however, to re-fire the shapes, to develop a strong, dense and hard product which can be roughly handled without injury. The calcined refractory when finally ground makes a good bonding material for the crushed clinker to form refractory shapes in general.

As an example: 100 parts by weight of Southern Nevada magnesite (analyzing MgO 30.2 per cent, CaO 5.7 per cent, $SiO_2$ 14.9 per cent, and metallic oxides 2.3 per cent), and 79 parts of dolomite (analyzing MgO 21.3 per cent, CaO 29.6 per cent, $SiO_2$ 0.4 per cent, and metallic oxides 0.1 per cent) are ground and mixed in slurry and fired to a temperature of about 2800° F. in about 3 hours. The dense, reddish brown clinker product may be crushed to minus 8 mesh containing further large portion of fine (minus 100 mesh) material, and be mixed with a small amount of water and be formed into shapes under moderate pressure.

As another example: 400 parts by weight of a dolomite, 160 parts of serpentine, 2 parts of phosphate rock and ½ part of boric acid are mixed and ground as a slurry and the slurry is fed into a rotary kiln and fired to a temperature of 2800° F. in about 1½ hours. The product is a dense, reddish brown clinker. This is crushed to minus 8 mesh to contain a fairly large portion of very fine (minus 100 mesh) material, is mixed with a small amount of water, and is formed into shapes under moderate pressure.

The analysis of the raw dolomite showed: CaO 29.6 per cent. MgO 21.3 per cent. $SiO_2$ 0.4 per cent. Metallic oxides 0.1 per cent.

The raw serpentine had the following compositions: CaO 0.9 per cent. MgO 36.8 per cent. $SiO_2$ 36.7 per cent. Metallic oxides 13.1 per cent.

The finished refractory on analysis showed the following composition: MgO 41.7 per cent. CaO 34.6 per cent. $SiO_2$ 17.5 per cent. Metallic oxides 6.2 per cent.

Under the microscope, the finished refractory showed rounded crystals of periclase with elongated interlocking interstitial crystalline calcium orthosilicate.

As another example: 100 parts of plastic sedimentary magnesite from Southern California (analyzing MgO 41.95 per cent, CaO 1.83 per cent, $SiO_2$ 7.14 per cent, and metallic oxides 2.15 per cent) and 38 parts of Northwestern Ohio dolomite (analyzing MgO 21.8 per cent, CaO 30.4 per cent, $SiO_2$ 0.1 per cent, and metallic oxides 0.1 per cent, are intimately mixed and formed into shapes or dobies, and fired at cone 20. The product was dense, light greenish brown, (analyzing MgO 68.0 per cent, CaO 19.0 per cent, $SiO_2$ 10.0 per cent, and metallic oxides 3.0 per cent. This was crushed, formed into shapes and re-fired.

As another example: 100 parts of Muddy River Nevada magnesite (analyzing MgO 35.2 per cent, CaO 6.8 per cent, $SiO_2$ 12.1 per cent, and metallic oxides 1.8 per cent), and 25 parts of Northwestern Ohio dolomite were intimately mixed, were shaped into dobies and fired at cone 20. The hard, dense, light greenish brown product analyzed MgO 55.9 per cent, CaO 27.1 per cent, $SiO_2$ 14.7 per cent, and metallic oxides 2.3 per cent. The dobies were crushed, re-made into shapes, and fired.

As another example: 400 parts by weight of dolomite, 144 parts of dunite, 2 parts of 20 per cent phosphate fertilizer and 2 parts of colemanite were mixed and ground wet to a slurry, and the slurry dried, briquetted, and fired to a temperature of about 2700° F. to a dense refractory material which was crushed, mixed with water and pressed into bricks and re-fired. The final refractory product showed the following analysis: MgO 43.3 per cent, CaO 34.1 per cent, $SiO_2$ 17.9 per cent, and metallic oxides 4.7 per cent.

This application is a continuation-in-part of my prior applications Serial No. 695,953, filed October 30, 1933, and Serial No. 699,464, filed November 23, 1933, being continuations-in-part of my prior application Serial No. 645,861, filed Dec. 5, 1932.

Other modes of applying the principle of the invention may be employed, change being made as regards the details described, provided however, the features stated in any of the following claims, or the equivalent of such, be employed.

I therefore particularly point out and distinctly claim as my invention:

1. A refractory preparation substantially consisting of magnesia, silica and lime in such proportions as to give on firing at high temperature a refractory comprising periclase granules in a calcium orthosilicate matrix.

2. As a new basic refractory, a mass consisting of a matrix of calcium orthosilicate in stabilized condition and dispersed granular magnesia in periclase form, the magnesia constituting the major portion of the refractory and being bonded by said matrix.

3. As a new refractory preparation, a mass of dispersed periclase granules in a lime-containing orthosilicate matrix of stable character, said preparation containing substantially only magnesia, lime and silica, the amount of lime being about that required to form calcium orthosilicate with the silica present.

4. In the manufacture of highly refractory, mechanically strong materials for furnace use, the process which comprises heating a mixture consisting of a major proportion of magnesia and minor proportions of silica and of lime until the magnesia crystallizes as periclase in a matrix including silica and lime as orthosilicate of which calcium orthosilicate is predominant.

5. The process of making refractory material from lime-magnesia starting materials which comprises providing therewith stabilizers and silica-containing materials and fluxing oxides in amounts so that there is sufficient lime to meet the chemical requirements of the fluxing oxides and stabilizers and to combine with the silica as an orthosilicate which is predominantly calcium orthosilicate, and heating the mixture to a temperature to produce complete combination to convert the lime to calcium compounds without residual free lime and to convert the residual magnesia to periclase, the composition of the resulting refractory material consisting substantially of periclase and calcium orthosilicate.

6. The process of making refractory material from lime-magnesia starting materials which comprises providing therewith stabilizers and silica-containing materials and fluxing oxides in amounts so that there is lime within the range of 1.8 to 2.2 of lime to silica, to give specifically 1.8 to about 2.0 of lime to combine with one part of silica and the remainder to combine with the fluxing oxides and the stabilizers, and heating the mixture to a temperature to produce complete combination to convert the lime to calcium compounds without residual free lime and to convert the residual magnesia to periclase, the composition of the resulting refractory material consisting substantially of periclase and calcium orthosilicate.

7. A refractory consisting substantially of periclase and calcium orthosilicate, and also containing a stabilizing agent formed from at least one of the oxides from the group consisting of chromium oxide, boron oxide and phosphorus oxide, and a fluxing agent formed from at least one of the oxides from the group consisting of iron oxide and aluminum oxide.

8. A refractory containing no un-combined lime, consisting substantially of a mass of dispersed periclase and orthosilicate, and containing a minor amount of reaction product of lime with at least one of the following oxides—iron oxide, aluminum oxide, chromium oxide, phosphorus oxide and boron oxide; which refractory, on chemical analysis shows sufficient lime to satisfy the chemical requirements of the oxide and to form orthosilicate which is predominantly calcium orthosilicate.

HARLEY C. LEE.